(12) United States Patent
Lim et al.

(10) Patent No.: US 9,935,334 B2
(45) Date of Patent: Apr. 3, 2018

(54) ELECTROLYTE AND RECHARGEABLE LITHIUM BATTERY INCLUDING SAME

(71) Applicant: SAMSUNG SDI CO., LTD., Yongin-si, Gyeonggi-do (KR)

(72) Inventors: Jin-Hyeok Lim, Yongin-si (KR); Ho-Seok Yang, Yongin-si (KR); Yun-Hee Kim, Yongin-si (KR); Young Sam Park, Yongin-si (KR); Hee-Yeon Hwang, Yongin-si (KR); Hyun-Woo Kim, Yongin-si (KR); Se-Jeong Park, Yongin-si (KR); Min-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 181 days.

(21) Appl. No.: 14/610,912

(22) Filed: Jan. 30, 2015

(65) Prior Publication Data

US 2015/0221976 A1   Aug. 6, 2015

(30) Foreign Application Priority Data

Feb. 3, 2014 (KR) ........................ 10-2014-0012268

(51) Int. Cl.
*H01M 10/0567* (2010.01)
*H01M 10/0525* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 2300/0025* (2013.01); *H01M 2300/0037* (2013.01); *H01M 2300/0091* (2013.01); *Y02E 60/122* (2013.01)

(58) Field of Classification Search
CPC ......... H01M 10/0567; H01M 10/0568; H01M 10/0525; H01M 2300/0025; Y02E 60/122
See application file for complete search history.

(56) References Cited

U.S. PATENT DOCUMENTS

| 2008/0138704 A1 | 6/2008 | Mizuta et al. |
| 2011/0039163 A1 | 2/2011 | Deguchi et al. |
| 2013/0337318 A1 | 12/2013 | Fujii et al. |

FOREIGN PATENT DOCUMENTS

| KR | 10-2007-0013326 A | 1/2007 |
| KR | 10-2009-0095577 A | 9/2009 |
| KR | 10-2011-0025791 A | 3/2011 |
| WO | WO 2010/018814 | * 2/2010 |

* cited by examiner

*Primary Examiner* — Laura Weiner
(74) *Attorney, Agent, or Firm* — Lewis Roca Rothgerber Christie LLP

(57) ABSTRACT

An electrolyte for a rechargeable lithium battery includes a lithium salt, a non-aqueous organic solvent, and an additive. The additive is represented by Chemical Formula 1, and is included in an amount of about 0.05 wt % to about 3 wt % based on the total amount of the electrolyte. A rechargeable lithium battery including the same is also disclosed.

Chemical Formula 1

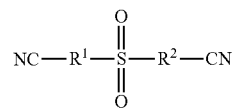

Chemical Formula 1 is as described in the present specification.

4 Claims, 2 Drawing Sheets

ELECTROLYTE AND RECHARGEABLE LITHIUM BATTERY INCLUDING SAME

CROSS-REFERENCE TO RELATED APPLICATION

This application claims priority to and the benefit of Korean Patent Application No. 10-2014-0012268 filed in the Korean Intellectual Property Office on Feb. 3, 2014, the entire content of which is incorporated herein by reference.

BACKGROUND

1. Field

One or more aspects of embodiments of the present invention are directed to an electrolyte for a rechargeable lithium battery and a rechargeable lithium battery including the same.

2. Description of the Related Art

A battery converts chemical energy generated from an electrochemical redox (reduction-oxidation) reaction of a chemical material in the battery into electrical energy. Primary batteries should be disposed after the energy of the battery is all consumed, and rechargeable batteries may be recharged many times due to the reversible conversion between chemical energy and electrical energy.

Due to recent developments, electronic devices have become small and light in weight, which lead to an increase in the popularity of portable electronic devices. Accordingly, demand for batteries with high energy density as a power source for such portable electronic devices has increased.

A typical rechargeable lithium battery is manufactured by injecting an electrolyte into a battery cell including a positive electrode including a positive active material capable of intercalating/deintercalating lithium and a negative electrode including a negative active material capable of intercalating/deintercalating lithium.

The electrolyte, which typically includes a lithium salt dissolved in an organic solvent, may be critical for the stability and performance of a rechargeable lithium battery.

SUMMARY

One embodiment of the present invention provides for an electrolyte for a rechargeable lithium battery capable of improving the swelling characteristics of the battery.

Another embodiment provides for a rechargeable lithium battery including the electrolyte.

In one embodiment, the electrolyte for a rechargeable lithium battery includes a lithium salt, a non-aqueous organic solvent, and an additive. The additive is represented by the following Chemical Formula 1, and is included in the electrolyte in an amount of about 0.05 wt % to about 3 wt % based on the total amount of the electrolyte.

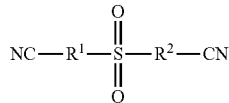

Chemical Formula 1

In the above Chemical Formula 1, $R^1$ and $R^2$ are each independently a substituted or unsubstituted C1 to C5 alkylene group.

In one embodiment, the additive is included in an amount of about 0.1 wt % to about 3 wt % based on the total amount of the electrolyte.

In one embodiment, the additive is included in an amount of about 1 wt % to about 3 wt % based on the total amount of the electrolyte.

The lithium salt may be included at a concentration of about 0.9 M to about 1.5 M.

In another embodiment, a rechargeable lithium battery includes a positive electrode, a negative electrode, and the electrolyte.

The rechargeable lithium battery may be operated at a voltage of greater than or equal to about 4.3 V.

According to embodiments of the present invention, the electrolyte for a rechargeable lithium battery and the rechargeable lithium battery including the electrolyte have improved cycle-life characteristics and safety at a high voltage and a high temperature.

DETAILED DESCRIPTION

Figure 1:
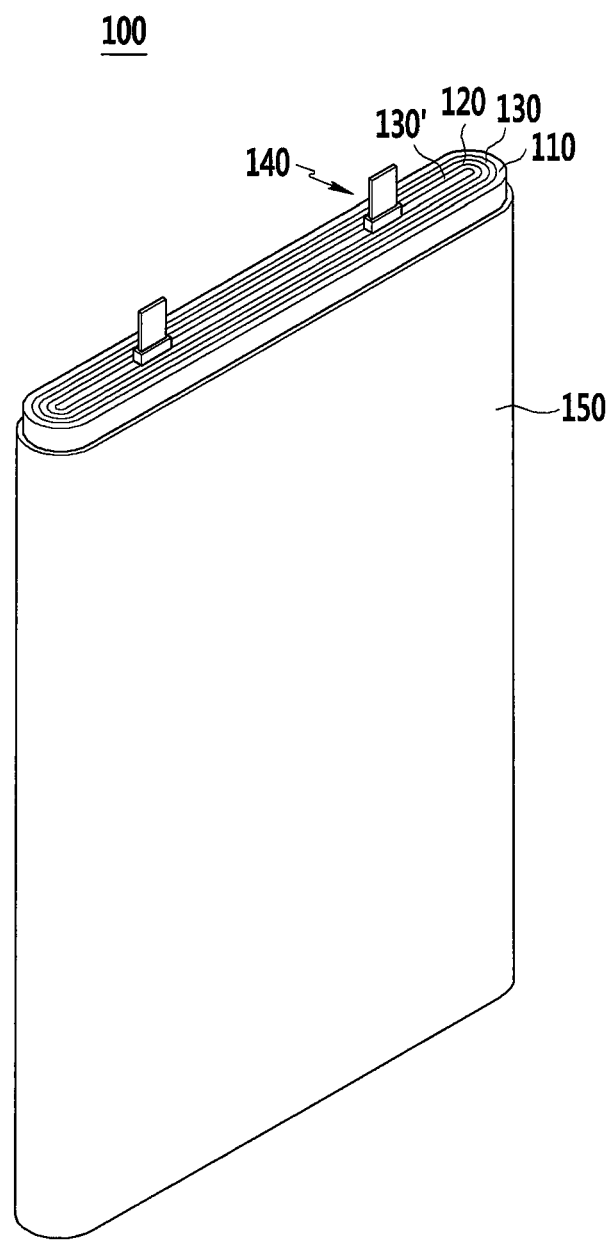
FIG. 1 is an exploded perspective view of a rechargeable lithium battery according to one embodiment.

Hereinafter, embodiments are described in detail. However, these embodiments are exemplary, and this disclosure is not limited thereto. As those skilled in the art would realize, the described embodiments may be modified in various different ways, all without departing from the spirit or scope of the present invention. Accordingly, the drawings and description are to be regarded as illustrative in nature and not restrictive.

As used herein, when a definition is not otherwise provided, the term "substituted" refers to a compound in which at least one hydrogen atom is substituted with a C1 to C30 alkyl group, a C2 to C30 alkenyl group, a C2 to C30 alkynyl group, a C1 to C10 alkylsilyl group, a C3 to C30 cycloalkyl group, a C6 to C30 aryl group, a C1 to C30 heteroaryl group, a C1 to C10 alkoxy group, a silane group, an alkylsilane group, an alkoxysilane group, an amine group, an alkylamine group, an arylamine group, or a halogen.

As used herein, when a definition is not otherwise provided, the term "alkylene group" may refer to a "saturated alkylene group" having no carbon-carbon double or triple bonds in the carbon chain of the alkylene group, or an "unsaturated alkylene group" having at least one carbon-carbon double or triple bond at one or more positions along the carbon chain of the alkylene group. The alkylene group may be branched, linear, or cyclic. The term "alkenylene group" refers to a divalent group including at least one carbon-carbon double bond at one or more positions along the carbon chain, and the term "alkynylene group" refers to a divalent group including at least one carbon-carbon triple bond at one or more positions along the carbon chain.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

An electrolyte for a rechargeable lithium battery according to one embodiment includes a lithium salt, a non-aqueous organic solvent, and an additive.

Additive

The additive is represented by the following Chemical Formula 1 and may be included in an amount of about 0.05 wt % to about 3 wt % based on the total amount of the electrolyte.

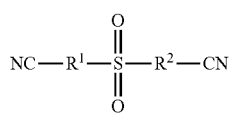

Chemical Formula 1

In the above Chemical Formula 1, $R^1$ and $R^2$ are each independently a substituted or unsubstituted C1 to C5 alkylene group.

The compound represented by Chemical Formula 1 includes two terminal cyano groups (—CN) and an internal sulfone group. The compound represented by Chemical Formula 1 may improve swelling characteristics (e.g. reduce swelling) of the rechargeable lithium battery at high temperature.

When the compound represented by Chemical Formula 1 is included in the electrolyte, a passivation film is formed on the surface of the positive electrode of a high voltage battery and thus, an oxidation decomposition reaction of the electrolyte with the positive electrode can be minimized or reduced. Additionally, the cyano group forms a coordinate bond with the metal ion on the surface of the positive electrode and thus, may reinforce structural stability of the rechargeable lithium battery.

In one embodiment, $R^1$ and $R^2$ are each independently a substituted or unsubstituted C1 to C5 alkylene group.

In one embodiment, $R^1$ and $R^2$ may each independently be a unsubstituted C1 to C5 alkylene group.

In one embodiment, the compound represented by Chemical Formula 1 is not necessarily symmetrical. In other words, $R^1$ and $R^2$ may be the same or different.

The compound represented by Chemical Formula 1 may be included in an amount of about 0.05 wt % to about 3 wt %, in some embodiments about 0.1 wt % to about 3 wt %, and in some embodiments about 1 wt % to about 3 wt % based on the total amount of the electrolyte.

When the compound represented by the above Chemical Formula 1 is included in an amount of less than about 0.05 wt %, the passivation film is not sufficiently formed on the surface of the positive electrode, and the desired effect may not be achieved.

When the compound represented by the above Chemical Formula 1 is included in an amount of greater than about 3 wt %, the passivation film becomes dense and more resistant and thus, may decrease charge and discharge efficiency.

The lithium salt may be included at a concentration of about 0.9 M to about 1.5 M.

When the concentration of the lithium salt is within this range, the electrolyte may have improved conductivity and viscosity and thus, may effectively move (or transport) lithium ions and may show good electrolyte performance.

The additive may further include additional additives (i.e. in addition to the additive described above) selected from vinylene carbonate, metal fluoride, glutaronitrile, succinonitrile, adiponitrile, 3,3'-thiodipropionitrile, 1,3-propane sultone, 1,3-propene sultone, lithium bis(oxalato)borate, lithium tetrafluoroborate, vinylethylene carbonate, fluoroethylene carbonate (FEC), difluoroethylenecarbonate, fluorodimethyl carbonate, fluoroethylmethyl carbonate, and/or a mixture thereof.

The additional additive may be included in an amount of about 0.1 parts by weight to about 10 parts by weight based on 100 parts by weight of the non-aqueous organic solvent.

When the additional additive is included within the above range, battery safety may be improved.

Non-Aqueous Organic Solvent

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethanol, isopropyl alcohol, and the like, and the aprotic solvent may include nitriles such as R—CN (where R is a C2 to C20 linear, branched, or cyclic hydrocarbon group, which may include a carbon-carbon double bond, an aromatic ring, or an ether bond) and the like; amides such as dimethylformamide and the like; dioxolanes such as 1,3-dioxolane and the like; and sulfolanes, and the like.

The non-aqueous organic solvent may be used alone or in a mixture. When the organic solvent is used in a mixture, the mixture ratio may be controlled in accordance with the desirable battery performance.

In one embodiment, the carbonate-based solvent is prepared by mixing a cyclic carbonate and a linear carbonate. The cyclic carbonate and the linear carbonate may be mixed together in the volume ratio of about 1:1 to about 1:9. When the volume ration of the cyclic carbonate to the linear carbonate is within this range, performance of the electrolyte may be improved.

In embodiments where the non-aqueous organic solvent includes a carbonate based solvent, the non-aqueous organic solvent may further include an aromatic hydrocarbon-based organic solvent. The carbonate-based solvent and the aromatic hydrocarbon-based solvent may be mixed together in a volume ratio ranging from about 1:1 to about 30:1.

The aromatic hydrocarbon-based organic solvent may be an aromatic hydrocarbon-based compound represented by the following Chemical Formula A.

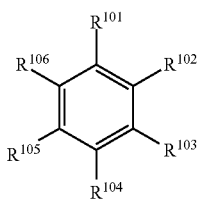

Chemical Formula A

In the above Chemical Formula A, $R^{101}$ to $R^{106}$ are each independently a hydrogen, a halogen, a C1 to C10 alkyl group, a C1 to C10 haloalkyl group, or a combination thereof.

Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In order to improve battery cycle-life, the non-aqueous electrolyte may further include vinylene carbonate or an ethylene carbonate-based compound of the following Chemical Formula B.

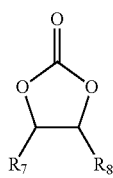

Chemical Formula B

In the above Chemical Formula B, $R_7$ and $R_8$ are each independently a hydrogen, a halogen, a cyano group (CN), a nitro group ($NO_2$), or a C1 to C5 fluoroalkyl group, where at least one of the $R_7$ and $R_8$ is a halogen, a cyano group (CN), a nitro group ($NO_2$), or a C1 to C5 fluoroalkyl group.

Non-limiting examples of the ethylene carbonate-based compound are fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and the like. The amount of the vinylene carbonate or the ethylene carbonate-based compound used to improve cycle life may be adjusted within an appropriate range.

Lithium Salt

In one embodiment, the lithium salt, when dissolved in the organic solvent, supplies lithium ions in the battery, improves lithium ion transportation between the positive and negative electrodes, and facilitates the basic operation of the rechargeable lithium battery. Non-limiting examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, e.g., an integer of 1 to 20, LiCl, LiI, $LiB(C_2O_4)_2$ (also known as lithium bis(oxalato)borate or LiBOB) or a combination thereof. In one embodiment, the lithium salt is used as a supporting electrolytic salt.

In another embodiment, a rechargeable lithium battery includes a positive electrode, a negative electrode and the electrolyte.

The rechargeable lithium battery may be a lithium ion battery, a lithium ion polymer battery, or a lithium polymer battery, depending on which separator and/or electrolyte is used. The rechargeable lithium battery may be cylindrical, prismatic, coin-type, pouch-type, and the like depending on the shape of the battery. In addition, the rechargeable lithium battery may be bulk type or thin film type depending on its size. Various structures and manufacturing methods for rechargeable lithium batteries should be apparent to those of ordinary skill in the art.

Referring to FIG. 1, a rechargeable lithium battery 100 according to one embodiment includes an electrode assembly 140 including a positive electrode 110, a first separator 130, a negative electrode 120, and a second separator 130' that are sequentially stacked, and a case 150 housing the electrode assembly 140. The positive electrode 110, the negative electrode 120, the first separator 130, and the second separator 130' may be impregnated with the electrolyte.

The electrode assembly according to one embodiment is formed by spirally winding the positive and negative electrodes and the two separators.

The rechargeable lithium battery according to one embodiment may be operated at a high voltage of greater than or equal to about 4.3 V.

In embodiments where a rechargeable lithium battery, and in some embodiments a high voltage battery, includes the electrolyte described herein, the swelling of the battery may be effectively suppressed or reduced.

Positive Electrode

In one embodiment, the positive electrode 110 includes a current collector and a positive active material layer on the current collector.

The current collector may include Al, but is not limited thereto.

The positive active material layer includes a positive active material, a binder, and, optionally, a conductive material.

The positive active material may include lithiated intercalation compounds that are capable of reversibly intercalating and deintercalating lithium ions. In one embodiment, the positive active material may include at least one composite oxide of lithium and a metal such as cobalt, manganese, nickel, or a combination thereof, but the positive active material is not limited thereto. Non-limiting examples of the composite oxide include a compound represented by one of the following chemical formulae: $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may include the positive active material with the coating layer, or a compound of the positive active material and the positive active material coated with the coating layer. The coating layer may include a coating element compound including but not limited to an oxide of the coating element, a hydroxide of the coating element, an oxyhydroxide of the coating element, an oxycarbonate of the coating element, or a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof, but the coating element is not limited thereto. The coating process may include any suitable processes as long as these processes do not cause any side effects on the properties of the positive active material (e.g., spray coating or immersing). Such processes should be apparent to those of ordinary skill in the art, and a detailed description thereof will not be provided here.

In one embodiment, the binder improves the binding properties of the positive active material particles with one another and with the current collector. Non-limiting examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

In one embodiment, the conductive material improves conductivity of the electrode. Any suitable electrically conductive material may be used as the conductive material, unless it causes a chemical change in the battery. The conductive material may include, without limitation, one or more mixtures of natural graphite, artificial graphite, carbon black, acetylene black, ketjen black, a carbon fiber, a metal powder, a metal fiber and the like of copper, nickel, aluminum, silver, and the like, a conductive material of a polyphenylene derivative, and the like.

Negative Electrode

In one embodiment, the negative electrode 120 includes a current collector and a negative active material layer on the current collector, and the negative active material layer includes a negative active material.

The negative active material may include, without limitation, a material that reversibly intercalates/deintercalates lithium ions, lithium metal, a lithium metal alloy, a material capable of doping and dedoping lithium, or a transition metal oxide.

The material that reversibly intercalates/deintercalates lithium ions may be a carbon material, and may be any suitable carbon-based negative active material that can be utilized in a rechargeable lithium ion battery. Non-limiting examples of the material that reversibly intercalates/deintercalates lithium ions include crystalline carbon, amorphous carbon, or a combination thereof. The crystalline carbon may have no shape, or may be sheet-shaped, flake-shaped, spherically-shaped, or fiber-shaped natural graphite or artificial graphite. The amorphous carbon may be a soft carbon, a hard carbon, a mesophase pitch carbonized product, fired coke, and the like.

The lithium metal alloy may be an alloy of lithium and a metal such as Na, K, Rb, Cs, Fr, Be, Mg, Ca, Sr, Si, Sb, Pb, In, Zn, Ba, Ra, Ge, Al, or Sn, but the lithium metal alloy is not limited thereto.

The material capable of doping and dedoping lithium may be, without limitation, Si, $SiO_x$ ($0<x<2$), a Si—C composite, a Si-Q alloy (where Q is an alkali metal, an alkaline-earth metal, one of Group 13 to 16 elements, a transition metal, a rare earth element, or a combination thereof, and Q is not Si), Sn, $SnO_2$, a Sn—C composite, a Sn—R (where R is an alkali metal, an alkaline-earth metal, one of Group 13 to 16 elements, a transition metal, a rare earth element, or a combination thereof, and R is not Sn), and the like. Non-limiting examples of Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof.

The transition metal oxide may be vanadium oxide, lithium vanadium oxide, and the like, but the transition metal oxide is not limited thereto.

In one embodiment, the negative active material layer includes a binder and, optionally, a conductive material.

In one embodiment, the binder improves the binding properties of the negative active material particles with one another and with the current collector. The binder includes a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxymethyl cellulose, hydroxypropylmethyl cellulose, methyl cellulose, or alkali metal salts thereof. In some embodiments, the alkali metal may be Na, K, or Li. Such a thickener may be included in an amount of about 0.1 parts by weight to about 3 parts by weight based on 100 parts by weight of the negative active material.

In one embodiment, the conductive material improves electrical conductivity of the electrode. Any suitable electrically conductive material may be used as the conductive material, unless it causes a chemical change in the battery. Non-limiting examples of the conductive material include a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof.

The current collector may be a copper foil, a nickel foil, a stainless steel foil, a titanium foil, a nickel foam, a copper foam, a polymer substrate coated with a conductive metal, or a combination thereof.

The negative electrode 120 and the positive electrode 110 may each be manufactured by a method including mixing the active material, the binder, and the conductive material in a solvent to provide an active material composition, and coating the active material composition on the current collector. The electrode manufacturing method should be apparent to those of ordinary skill in the art and will not be described in the present specification. The solvent may include N-methylpyrrolidone and the like, but is not limited thereto.

Separator

In one embodiment, the rechargeable lithium may include two separators 130 and 130'. The separator may include any suitable material that can be utilized in a rechargeable lithium battery as long as the material is capable of separating the negative electrode from the positive electrode and providing a transporting passage for lithium ions. In other words, the separator may have a low resistance to ion transportation and good characteristics for impregnation of an electrolyte. Non-limiting examples of the separator include glass fiber, polyester, TEFLON (tetrafluoroethylene), polyethylene, polypropylene, polytetrafluoroethylene (PTFE), or a combination thereof. The separator may have a form of a non-woven fabric or a woven fabric. In one embodiment, a polyolefin-based polymer separator such as polyethylene, polypropylene or the like is used for the lithium ion battery. In order to provide the desired heat resistance and/or mechanical strength, a coated separator including a ceramic component or a polymer material may be used. The separator may have a mono-layered or a multi-layered structure.

Alternatively, the first separator positioned between the positive and the negative electrodes may have no adherence, while the second separator positioned between the negative and the positive electrodes may have adherence. When the separator having no adherence is used in a thin rechargeable lithium battery with the separator having adherence, the two separators may prevent or reduce the expansion of the battery during the charge and discharge cycle, and may improve battery safety by adjusting the strength of the battery to facilitate advantageous vertical compression, without a substantial increase in the thickness of the battery. Specifically, when the strength of the battery is decreased, the battery may be better vertically compressed and thus, may cause an electrical short circuit that may prevent or reduce the chance of the explosion of the battery from overheating and the like. Accordingly, battery safety may be improved.

Hereinafter, examples of the present invention and comparative examples are described. These examples, however, should not in any sense be interpreted as limiting the scope of the present invention.

Example 1

A positive electrode was manufactured by mixing 97.4 wt % of $LiCoO_2$ as a positive active material, 1.3 wt % of polyvinylidene fluoride as a binder, 1.3 wt % of Denka black as a conductive material and dispersing the resulting mixture in N-methyl pyrrolidone to prepare a positive active material layer composition, coating the positive active material layer composition on an aluminum foil, followed by drying and compressing.

A negative electrode was manufactured by mixing 98 wt % of graphite as a negative active material, 1 wt % of a styrene-butadiene rubber (SBR) as a binder, and 1 wt % of carboxymethyl cellulose (CMC) and dispersing the resulting mixture in pure water to prepare a negative active material layer composition, coating the negative active material layer composition on a copper foil, followed by drying and compressing.

An electrolyte solution was prepared by mixing ethylene carbonate (EC):ethylmethyl carbonate (EMC):dimethyl carbonate (DMC) in a volume ratio of 1:1:1 to prepare a mixed solution, adding $LiPF_6$ having a concentration of 1.0M to the mixed solution, and adding 0.1 wt % of a compound represented by the following Chemical Formula 1-1 as an additive to the mixed solution.

Chemical Formula 1-1

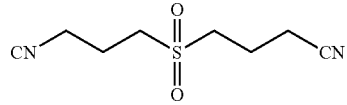

The positive and negative electrodes and a polypropylene separator were put in a battery case, and the electrolyte was injected therein, thus manufacturing a rechargeable lithium battery cell.

Example 2

A rechargeable lithium battery cell was manufactured as in Example 1 except for preparing the electrolyte by using 0.5 wt % of the compound represented by the above Chemical Formula 1-1 instead of 0.1 wt %.

Example 3

A rechargeable lithium battery cell was manufactured as in Example 1 except for preparing the electrolyte by using 1 wt % of the compound represented by the above Chemical Formula 1-1 instead of 0.1 wt %.

Example 4

A rechargeable lithium battery cell was manufactured as in Example 1 except for preparing the electrolyte by using 2 wt % of the compound represented by the above Chemical Formula 1-1 instead of 0.1 wt %.

Example 5

A rechargeable lithium battery cell was manufactured as in Example 1 except for preparing the electrolyte by using 3 wt % of the compound represented by the above Chemical Formula 1-1 instead of 0.1 wt %.

Comparative Example 1

A rechargeable lithium battery cell was manufactured as in Example 1 except for using the electrolyte that did not include the compound represented by the above Chemical Formula 1-1.

Comparative Example 2

A rechargeable lithium battery cell was manufactured as in Example 1 except for preparing the electrolyte by using 5 wt % of the compound represented by the above Chemical Formula 1-1 instead of 0.1 wt %.

Evaluation 1: Thickness Variation Ratio of Battery Cell

The initial thicknesses of each of the 4000 mAh LCO (LiCoO$_2$) prismatic cells according to Examples 1 to 5 and Comparative Examples 1 and 2 was measured by fully charging the cells at 0.5 C and 25° C., and then measuring the change in the thickness of the cells while the cells were allowed to stand at 60° C. for one month, and the results are provided in the following Table 1 and FIG. 2.

TABLE 1

|  | Swelling (%) after 30 days (at 60° C.) |
|---|---|
| Example 1 | 36.5% |
| Example 2 | 33.8% |
| Example 3 | 26.1% |
| Example 4 | 21.5% |
| Example 5 | 19.4% |
| Comparative Example 1 | 39.3% |
| Comparative Example 2 | 51.4% |

Figure 2:
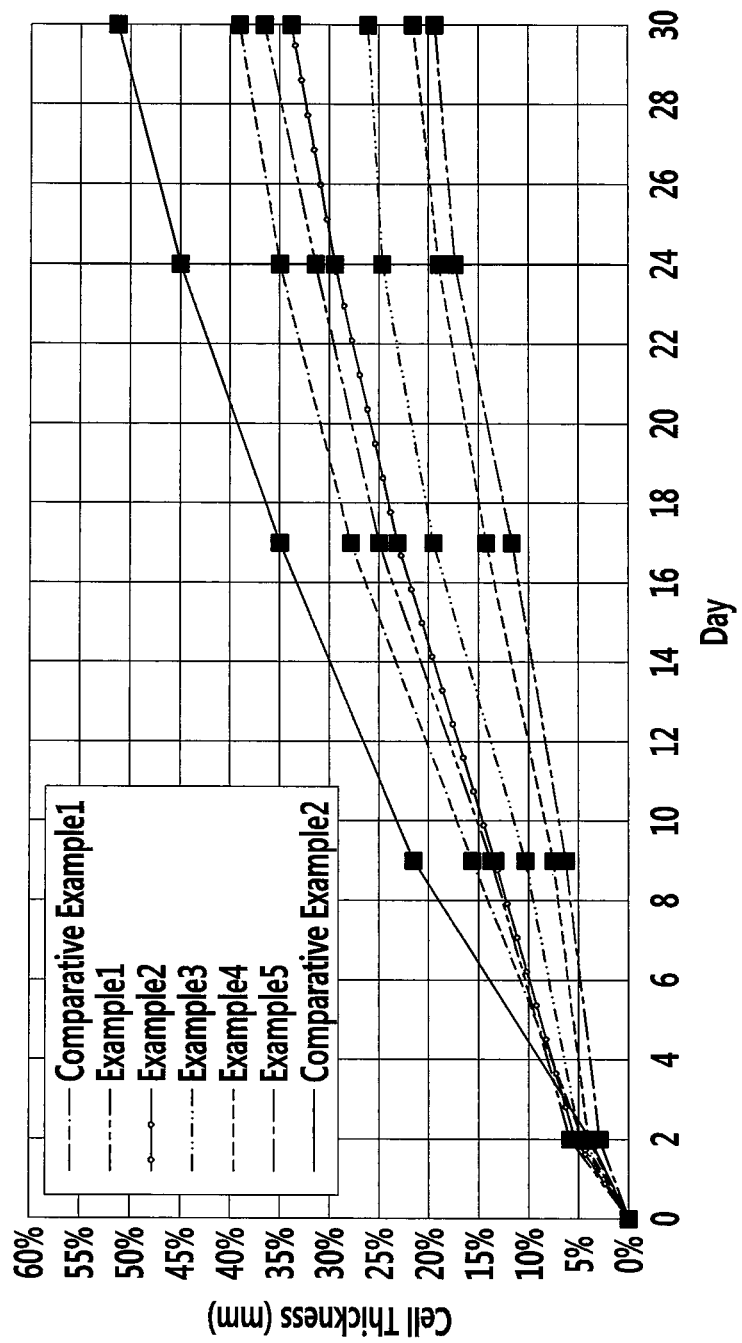
FIG. 2 is a graph showing daily thickness change of battery cells according to Examples 1 to 5 and Comparative Examples 1 and 2 when allowed to stand at 60° C.

FIG. 2 is a graph showing daily change in the thickness of the cells according to Examples 1 to 5 and Comparative Examples 1 and 2 over a period of 30 days, when the cells were allowed to stand at 60° C.

Referring to FIG. 2, the cells according to Examples 1 to 5 showed lower thickness increase rate compared with the cells according to Comparative Examples 1 and 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A rechargeable lithium battery comprising
a positive electrode comprising Li$_a$A$_{1-b}$R$_b$D$_2$ (0.90≤a≤1.8 and 0≤b≤0.5, A is Ni, Co, Mn, or a combination thereof; R is Al, Ni, Co, Mn, Cr, Fe, Mg, Sr, V, a rare earth element, or a combination thereof; D is O, F, S, P, or a combination thereof) as a positive active material;
a negative electrode comprising graphite as a negative active material; and
an electrolyte comprising LiPF$_6$ as a lithium salt, a mixture of carbonates, the carbonate being selected from dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC) as a non-aqueous organic solvent, and an additive represented by Chemical Formula 1:

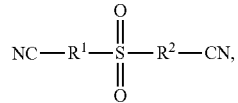

Chemical Formula 1 wherein R$^1$ and R$^2$ are each independently an unsubstituted C1 to C5 alkylene group,
wherein the additive is in an amount of about 0.1 wt % to about 3 wt % based on the total amount of the electrolyte.

2. The rechargeable lithium battery of claim 1, wherein the additive is in an amount of about 1 wt % to about 3 wt % based on the total amount of the electrolyte.

3. The rechargeable lithium battery of claim 1, wherein the lithium salt is in a concentration of about 0.9 M to about 1.5 M.

4. A rechargeable lithium battery comprising:
a positive electrode comprising Li$_a$A$_{1-b}$R$_b$D$_2$ (0.90≤a≤1.8 and 0≤b≤0.5, A is Ni, Co, Mn, or a combination thereof; R is Al, Ni, Co, Mn, Cr, Fe, Mg, Sr, V, a rare earth element, or a combination thereof; D is O, F, S, P, or a combination thereof) as a positive active material;
a negative electrode comprising graphite as a negative active; and
an electrolyte comprising LiPF$_6$ as a lithium salt, a mixture of carbonates, the carbonate being selected from dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC) as a non-aqueous organic solvent, and an additive represented by Chemical Formula 1:

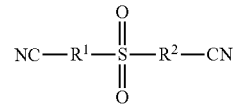

Chemical Formula 1 wherein R$^1$ and R$^2$ are each independently a C1 to C5 alkylene group substituted with a C1 to C10 alkylsilyl group, a C3 to C30 cycloalkyl group, a C6 to C30 aryl group, a C1 to C30 heteroaryl group, a C1 to C10 alkoxy group, a silane group, an alkylsilane group, an alkoxysilane group, an amine group, an alkylamine group, an arylamine group, or a halogen, and
wherein the additive is in an amount of about 0.1 wt % to about 3 wt % based on the total amount of the electrolyte.

* * * * *